(12) United States Patent
Mackinlay et al.

(10) Patent No.: US 10,572,114 B2
(45) Date of Patent: Feb. 25, 2020

(54) SYSTEMS AND METHODS FOR EFFECTIVELY USING DATA CONTROLS IN A GRAPHICAL USER INTERFACE ON A SMALL VISUAL DISPLAY

(71) Applicant: Tableau Software, Inc., Seattle, WA (US)

(72) Inventors: Jock Douglas Mackinlay, Bellevue, WA (US); Christopher Richard Stolte, Seattle, WA (US); Jeffrey W. Pettiross, Seattle, WA (US); James Baker, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 201 days.

(21) Appl. No.: 15/884,350

(22) Filed: Jan. 30, 2018

(65) Prior Publication Data

US 2018/0157393 A1 Jun. 7, 2018

Related U.S. Application Data

(63) Continuation of application No. 13/886,919, filed on May 3, 2013, now Pat. No. 9,880,710.

(Continued)

(51) Int. Cl.
*G06F 3/048* (2013.01)
*G06F 3/0484* (2013.01)

(52) U.S. Cl.
CPC ........ *G06F 3/0484* (2013.01); *G06F 3/04847* (2013.01)

(58) Field of Classification Search
CPC .................. G06F 3/04847; G06F 3/04812

(Continued)

(56) References Cited

U.S. PATENT DOCUMENTS 7,443,385 B2 * 10/2008 Eastty ................. G06F 3/04847
178/18.01
8,788,390 B2 * 7/2014 Jhunjhunwala ........ G06Q 30/02
705/36 R (Continued)

OTHER PUBLICATIONS

Mackinlay, Office Action, U.S. Appl. No. 13/886,919, dated Mar. 27, 2015, 27 pgs.

(Continued)

*Primary Examiner* — Shourjo Dasgupta
(74) *Attorney, Agent, or Firm* — Morgan, Lewis & Bockius LLP

(57) ABSTRACT

A user interacts with a graphical user interface on a client device. The device displays a data visualization that includes configuration parameters. The device also displays one or more read-only static controls, each static control corresponding to a respective parameter. Each static control indicates the value assigned to the corresponding parameter. A first user action activates a first static control. The first static control corresponds to a first parameter with a first value. The device displays an editable indirect control in the graphical user interface, which displays the first value. The editable indirect control is larger than the first static control, and is superimposed over the corresponding static control. The user changes the first value to a second value, and the device updates the displayed data visualization based on the second value for the first parameter. The editable indirect control is subsequently removed from display in the graphical user interface.

20 Claims, 11 Drawing Sheets

Related U.S. Application Data

(60) Provisional application No. 61/642,331, filed on May 3, 2012.

(58) Field of Classification Search
USPC .......................................................... 715/781
See application file for complete search history.

(56) References Cited

U.S. PATENT DOCUMENTS

| | | | | |
|---|---|---|---|---|
| 8,977,986 B2* | 3/2015 | Herz | ............... | G06F 3/0482 715/719 |
| 2004/0268267 A1* | 12/2004 | Moravcsik | ......... | G03G 15/5016 715/821 |
| 2007/0055782 A1* | 3/2007 | Wright | ................. | G06T 11/206 709/227 |
| 2009/0315848 A1* | 12/2009 | Ku | ....................... | G06F 3/0416 345/173 |
| 2009/0327977 A1* | 12/2009 | Bachfischer | ........... | B60K 35/00 715/863 |
| 2010/0066694 A1* | 3/2010 | Jonsdottir | ............. | G06F 3/0236 345/173 |
| 2011/0107267 A1* | 5/2011 | Ha | ........................ | G06F 3/0482 715/841 |
| 2011/0116505 A1* | 5/2011 | Hymus | ............... | H04L 65/1069 370/392 |
| 2012/0117470 A1* | 5/2012 | Michelstein | .......... | G06F 3/0482 715/709 |
| 2012/0137238 A1* | 5/2012 | Abeln | ................. | G06F 3/04847 715/771 |
| 2013/0097551 A1* | 4/2013 | Hogan | .................. | G06F 3/0488 715/780 |
| 2014/0082559 A1* | 3/2014 | Suggs | ....................... | G06F 1/16 715/835 |

OTHER PUBLICATIONS

Mackinlay, Final Office Action, U.S. Appl. No. 13/886,919, dated Nov. 19, 2015, 15 pgs.
Mackinlay, Office Action, U.S. Appl. No. 13/886,919, dated May 5, 2016, 13 pgs.
Mackinlay, Final Office Action, U.S. Appl. No. 13/886,919, dated Dec. 1, 2016, 13 pgs.
Mackinlay, Notice of Allowance, U.S. Appl. No. 13/886,919, dated Aug. 11, 2017, 7 pgs.

* cited by examiner

SYSTEMS AND METHODS FOR EFFECTIVELY USING DATA CONTROLS IN A GRAPHICAL USER INTERFACE ON A SMALL VISUAL DISPLAY

PRIORITY

This application is a continuation of U.S. patent application Ser. No. 13/886,919, filed May 3, 2013, entitled "Systems and Methods for Effectively Using Data Controls in a Graphical User Interface on a Small Visual Display," which claims priority to U.S. Provisional Application Ser. No. 61/642,331, filed May 3, 2012, entitled "Systems and Methods for Effectively Using Data Controls in a Graphical User Interface on a Small Visual Display," each of which is incorporated by reference herein in its entirety.

TECHNICAL FIELD

The disclosed embodiments relate generally to graphical user interfaces and more specifically to methods and systems for efficiently using data controls in a graphical user interface on a small visual display.

BACKGROUND

With touch-sensitive displays on small client devices such as a Smart Phone or tablet computer, the size of the display poses some difficulties for the user. Even if the user's eyesight is good, it is difficult to manipulate graphical controls with a finger that is large relative to the screen or to the displayed graphical controls. In many instances, a user must zoom in (e.g., by "pinching"), interact with the control, then zoom back out to see the effect of the change. This is particularly cumbersome when the process of zooming in and out must be repeated multiple times.

A similar problem occurs on a larger display screen when the user has physical limitations. For example, a user with impaired eyesight may have difficulty interacting with an ordinary graphical control. Alternatively, even a person with good eyesight may have impaired motor skills, making it difficult to accurately manipulate a pointing device (e.g., a mouse) or to position a finger accurately over a graphical control. The problems created by impaired eyesight or impaired motor skills are similar to the problems created by having a display screen that is small.

SUMMARY

Disclosed embodiments address the above deficiencies and other problems associated with effectively utilizing a small display on a client device. Although some disclosed embodiments address the small display size of client devices in the context of displaying data visualizations, one of skill in the art would recognize that the same techniques can be applied more generally with graphical controls in any graphical user interface where the display screen is small.

A fundamental problem created by small display screens is the cycle of pinching to zoom-in to interact with graphical controls and pinching to zoom-out to see the result of the changes. The disclosed embodiments address this problem in a number of ways. Some embodiments provide a startup message that reminds the user to "tap to interact" with the non-editable static display controls. The "in-place" static controls describe their current settings without having the graphic appearance of an interactive widget (no check boxes, slider handles, etc.). When the user taps in a static control, an "indirect" control pops up that is designed for finger interaction. When the indirect control affects the appearance or contents of the graphical user interface (such as a configuration parameter for a data visualization), the display updates as the user interacts with indirect control to control or filter the view. In some embodiments, the user dismisses the indirect control by tapping outside the popup. To facilitate ease of use, the static and indirect controls convey their differences visually. For example, the indirect controls clearly convey that they are open. Users can see that the popup is open without any dimming to the underlying data visualization or other graphical elements. This is accomplished by showing typical control elements, such as slider handles, selectable buttons, and an outline, border, or shadow for the popup. The corresponding static controls, on the other hand, do not have outlines, and do not have interactive control elements. For example, a slider handle on a static control is just a small bar that indicates the setting. In addition, some embodiments use color or font characteristics to distinguish between static controls and indirect controls (e.g., indirect controls may utilize more color).

In accordance with some embodiments, a computer-implemented method executes at a client device with one or more processors and memory. In some embodiments, the client device is a smart phone or tablet computer. The memory stores one or more programs for execution by the one or more processors. The programs include instructions enabling a user to interact with a graphical user interface on the client device. The graphical user interface displays a data visualization that includes one or more configuration parameters. Each configuration parameter is assigned a configuration value selected from a set of possible configuration values for the respective configuration parameter. The graphical user interface also displays one or more read-only static controls, each static control corresponding to a respective configuration parameter. The display of each static control includes an indication of the configuration value assigned to the corresponding respective configuration parameter. The one or more programs identify a first user action to activate a first static control (which is one of the displayed one or more static controls). The first static control corresponds to a first configuration parameter with a first configuration value. In response to the identified first user action, the one or more programs display an editable indirect control in the graphical user interface. The editable indirect control corresponds to the first static control, and the editable indirect control displays the first configuration value. The editable indirect control is substantially larger than the first static control, and the editable indirect control is substantially superimposed over the corresponding static control. The one or more programs receive input from the user to change the first configuration value to a second configuration value, and update the displayed data visualization based on the second configuration value for the first configuration parameter. The editable indirect control is subsequently removed from display in the graphical user interface.

Thus methods and systems are provided that effectively and efficiently utilize data controls in a graphical user interface on a small client device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1:
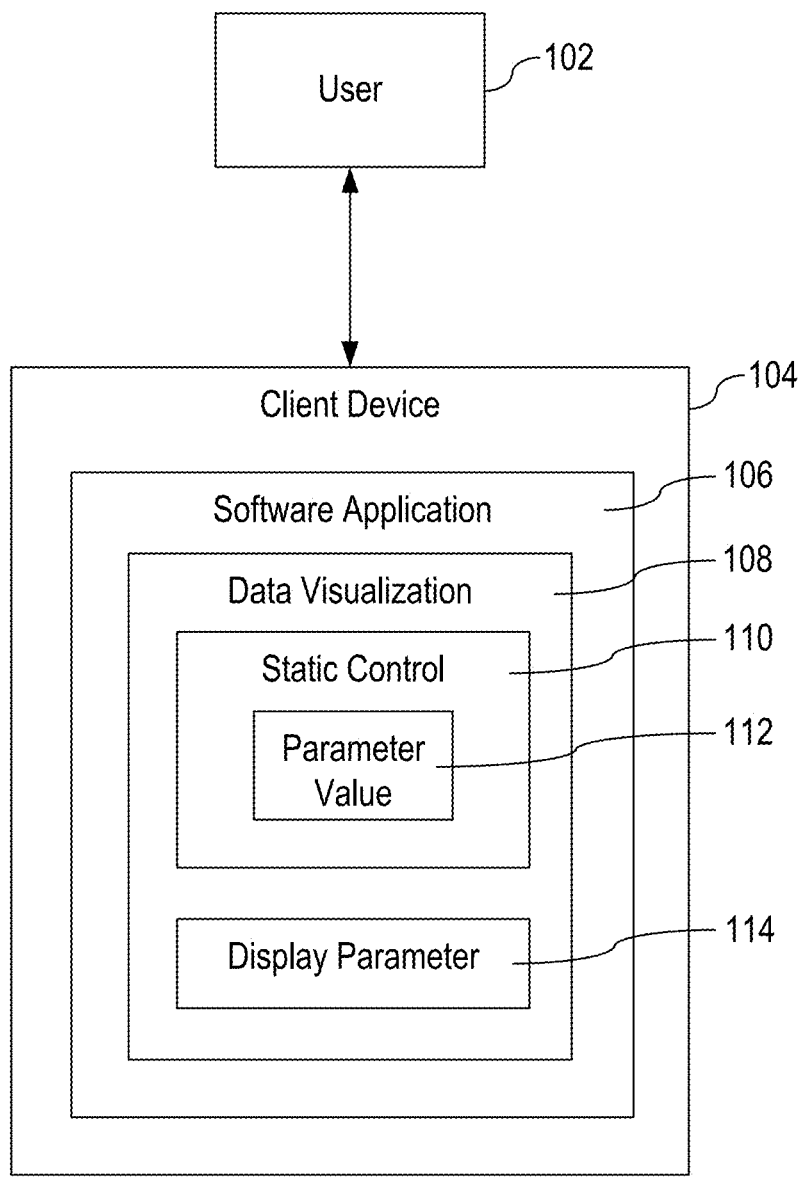
FIG. 1 illustrates conceptually a context in which some embodiments operate.
Figure 6A:
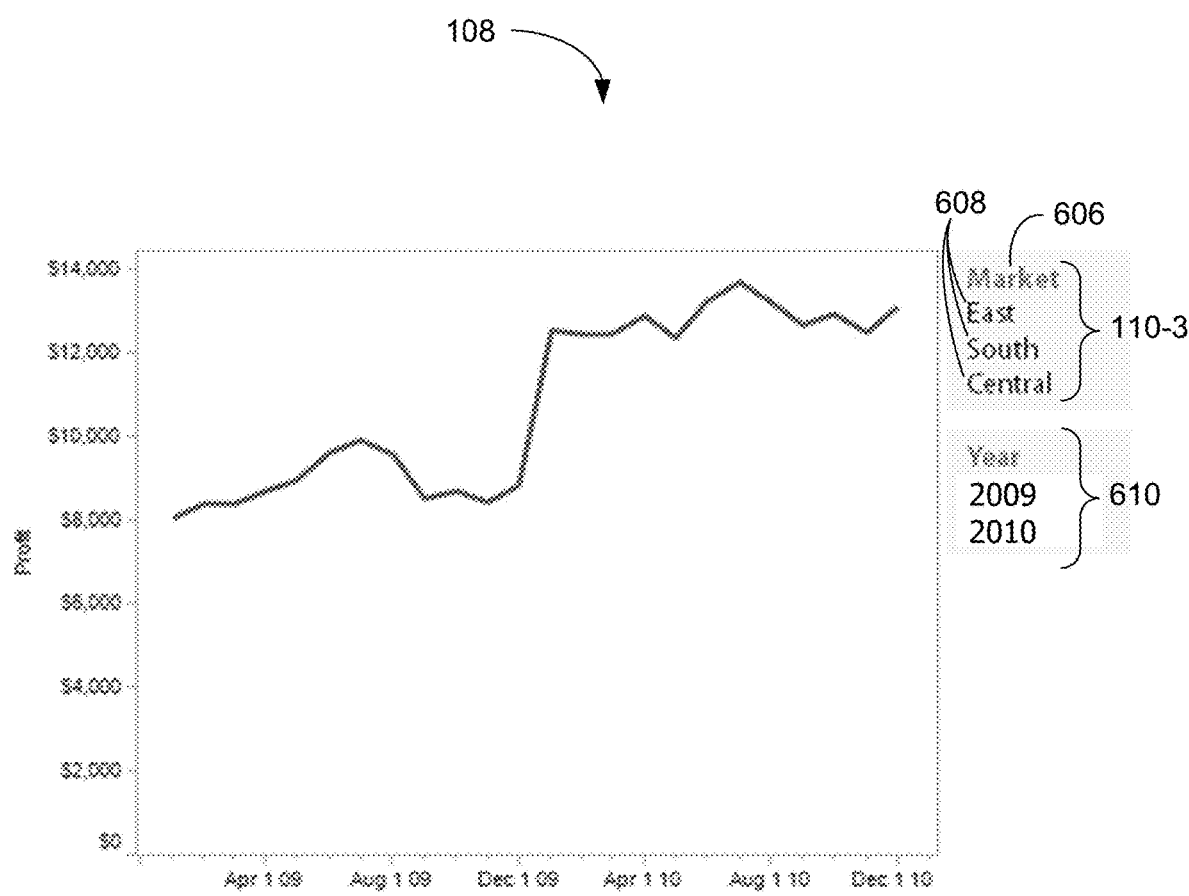
FIGS. 6A, 6B, 6C, and 6D illustrate activating a static control to display a corresponding indirect control according to some embodiments.
Figure 9:
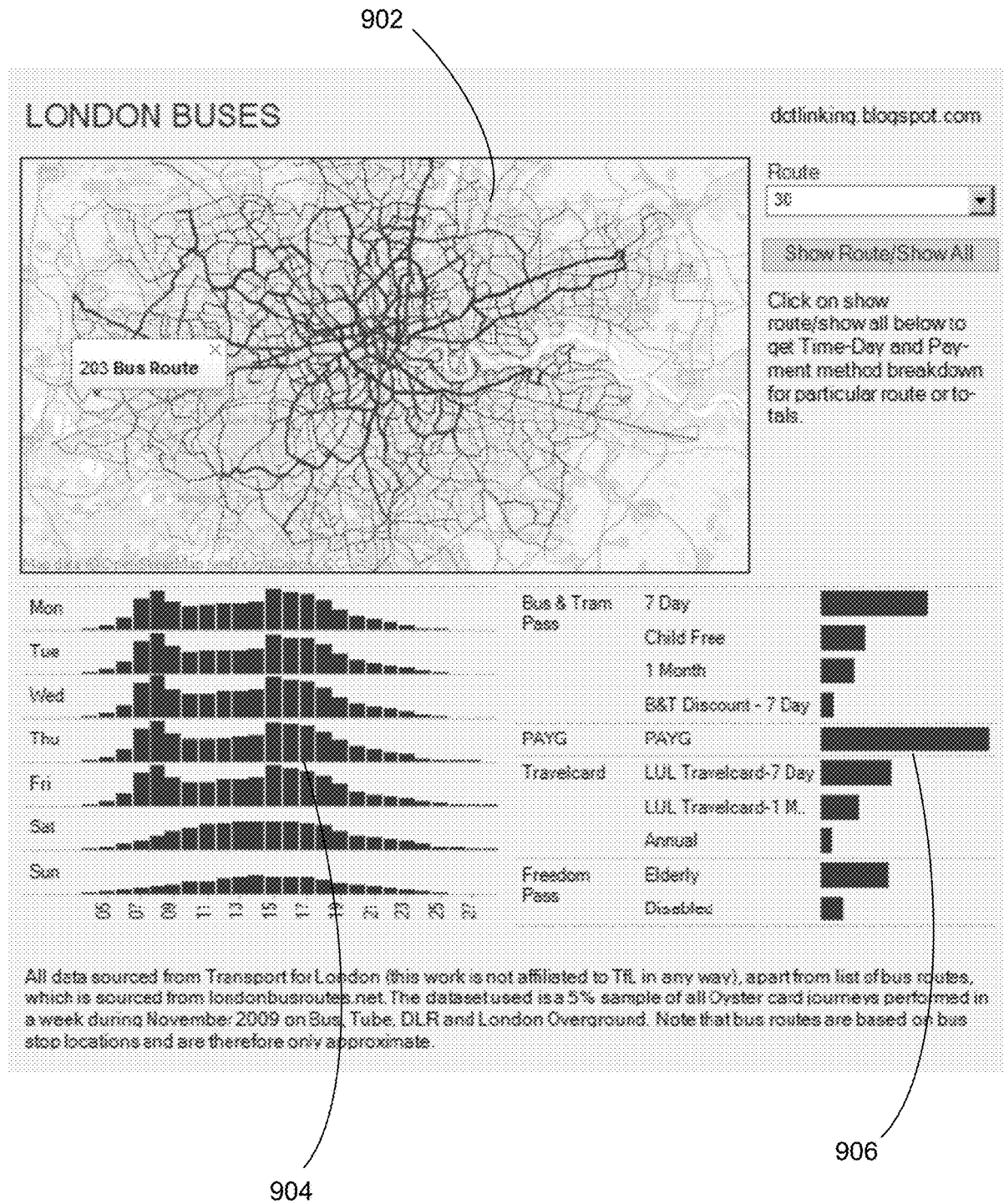
FIG. 9 illustrates a composite data visualization, which may utilize display parameters in accordance with some embodiments.

FIG. 1 illustrates conceptually a context in which some embodiments operate. A user 102 interacts with a client device 104, which may be a SmartPhone, tablet computer, or other small computing device. In some embodiments, the client device 104 has a touch-screen display (also called a touch-sensitive display); some embodiments use a stylus or other pointing device to interact with the client device 104. One or more software applications 106 execute on the client device. In some embodiments, the software application 106 is an application that displays data visualizations 108. As used herein, a data visualization is any graphic that visually displays a set of underlying data. For example, a two dimensional graphical plot of points, a pie chart, or a bar graph are all data visualizations. FIG. 6A, described in detail below, illustrates a data visualization. FIG. 9 displays a composite of three data visualizations 902, 904, and 906, each of which provides information about London buses. The full composite FIG. 9 is also a data visualization.

Display parameters 114 are one way of controlling or filtering what data is included in a data visualization. For example, in FIG. 6A below, the sales data shown is limited to the years 2009 and 2010. In this example, one display parameter 114 is the set of years to include, and the parameter value 112 is {2009, 2010}. Display parameters thus enable a user to select the desired data to view. As this example illustrates, a parameter "value" 112 may be a set of values rather than a single number, date, or character string. The parameter value 112 is displayed using a static control 110. As used herein, the terms "display parameter," "parameter," and "configuration parameter" are used interchangeably.

A typical graphical control, such as a check box, set of option buttons, or drop down list, is interactive, allowing a user to make or change selections. A static control 110, in contrast, is not directly editable. A static control 110 displays useful information such as a description of a parameter 114 and the corresponding current value 112 of the parameter. As described in greater detail below, the user 102 can activate a static control 110 to bring up an indirect control 116, which can be edited.

Figure 2:
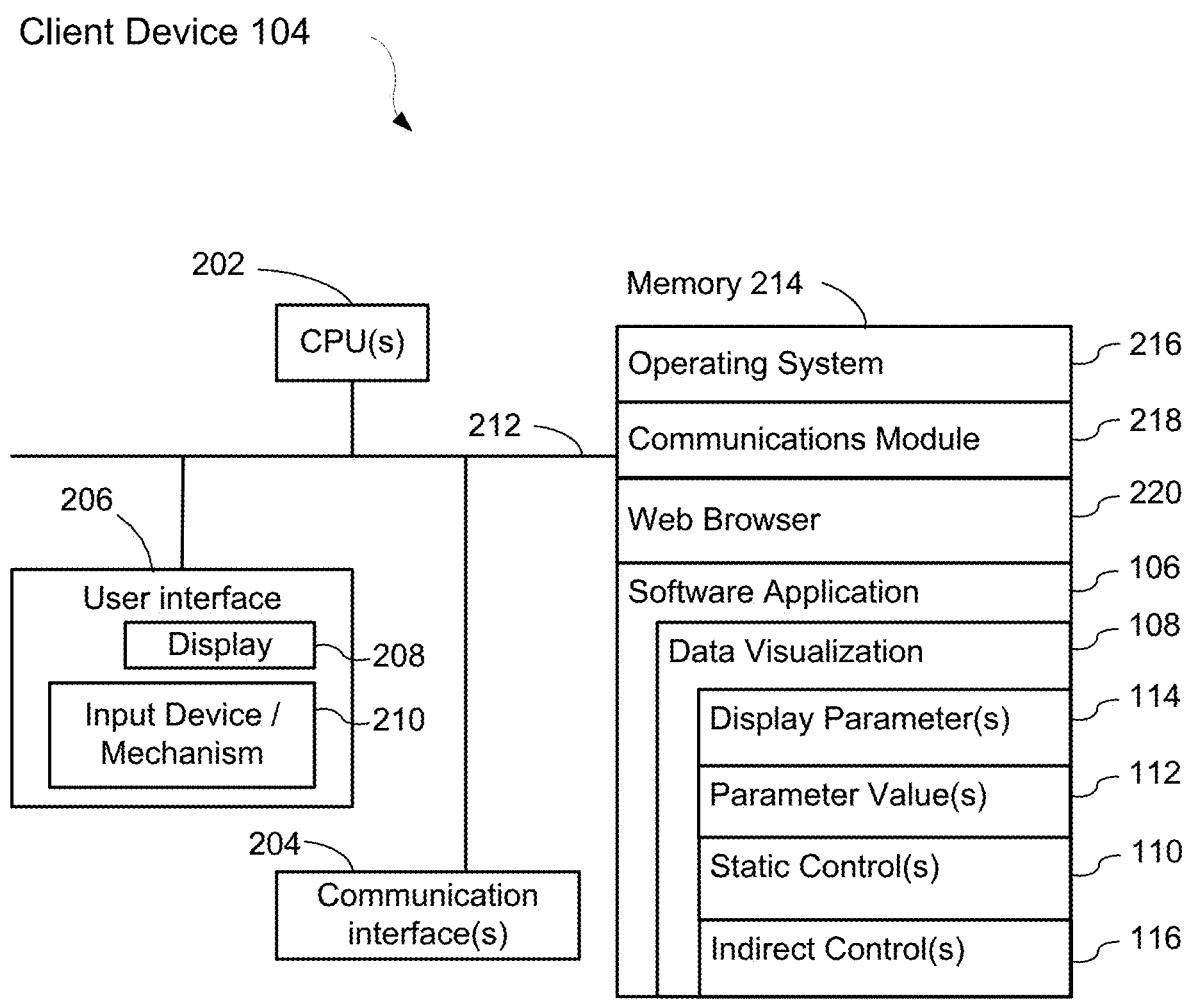
FIG. 2 is a block diagram of a client device according to some embodiments.

FIG. 2 is a block diagram illustrating a client device 104 that a user 110 utilizes to display data visualizations 108 in accordance with some disclosed embodiments. A client device 104 typically includes one or more processing units/cores (CPU's) 202 for executing modules, programs, and/or instructions stored in memory 214 and thereby performing processing operations; one or more network or other communications interfaces 204; memory 214; and one or more communication buses 212 for interconnecting these components. The communication buses 212 may include circuitry that interconnects and controls communications between system components. A client device 104 includes a user interface 206 comprising a display device 208 and one or more input devices or mechanisms 210. In some embodiments, the input device/mechanism includes a keyboard; in some embodiments, the input device/mechanism includes a "soft" keyboard, which is displayed as needed on the display device 208, enabling a user 100 to "press keys" that appear on the display 208. In some embodiments, the display 208 and input device/mechanism 210 comprise a touch screen display (also called a touch sensitive display). In some embodiments, memory 214 includes high-speed random access memory, such as DRAM, SRAM, DDR RAM or other random access solid state memory devices. In some embodiments, memory 214 includes non-volatile memory, such as one or more magnetic disk storage devices, optical disk storage devices, flash memory devices, or other non-volatile solid state storage devices. Optionally, memory 214 includes one or more storage devices remotely located from the CPU(s) 202. Memory 214, or alternately the non-volatile memory device(s) within memory 214, comprises a computer readable storage medium. In some embodiments, memory 214, or the computer readable storage medium of memory 214, stores the following programs, modules and data structures, or a subset thereof:

an operating system 216 that includes procedures for handling various basic system services and for performing hardware dependent tasks;

a communications module 218 that is used for connecting the client device 104 to other computers and devices via the one or more communication network interfaces 204 (wired or wireless) and one or more communication networks, such as the Internet, other wide area networks, local area networks, metropolitan area networks, and so on;
a web browser 220 (or other client application) that enables a user 102 to communicate over a network with remote computers or devices;
one or more software applications 106, including a software application 106 that displays data visualizations 108. A software application 106 may execute within the web browser 220 or directly on the client device 104 (e.g., interacting directly with the operating system 216);
one or more display parameters 114 corresponding to each data visualization 108. As illustrated in FIGS. 4A, 4B, 5A, 5B, 6A-C, 7A, and 7B below, display parameters control what data is included in the data visualization. As FIG. 6A below illustrates, two or more display parameters can be associated with a single data visualization;
a parameter value 112 for each of the display parameters 114. A parameter value can be a number, a range of numbers, a date, a Boolean true/false value, a character string (fixed length or variable length), a set of values, etc. The parameter values 112 specify what data to include in the data visualization;
one or more static controls 110, which are displayed in a data visualization 108 to display the current values 112 of the display parameters 114. There is a static control 110 for each of the display parameters 114; and
one or more indirect controls 116, one corresponding to each of the static controls 110. When a data visualization 108 is initially displayed, only the static controls 110 are displayed; a user 102 activates a static control 110 to display the corresponding indirect control 116, which allows the user 102 to edit the associated parameter value 112. In some embodiments, indirect controls 116 are implemented as modal popups, in which case only one indirect control 116 can be visible (i.e., active) at any time. Other embodiments implement indirect controls 116 as modeless popups, in which case multiple indirect controls 116 may be accessible at the same time.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 214 may store a subset of the modules and data structures identified above. Furthermore, memory 214 may store additional modules or data structures not described above.

Although FIG. 2 shows a client device 104, FIG. 2 is intended more as functional description of the various features that may be present rather than as a structural schematic of the embodiments described herein. In practice, and as recognized by those of ordinary skill in the art, items shown separately could be combined and some items could be separated.

Figure 3:
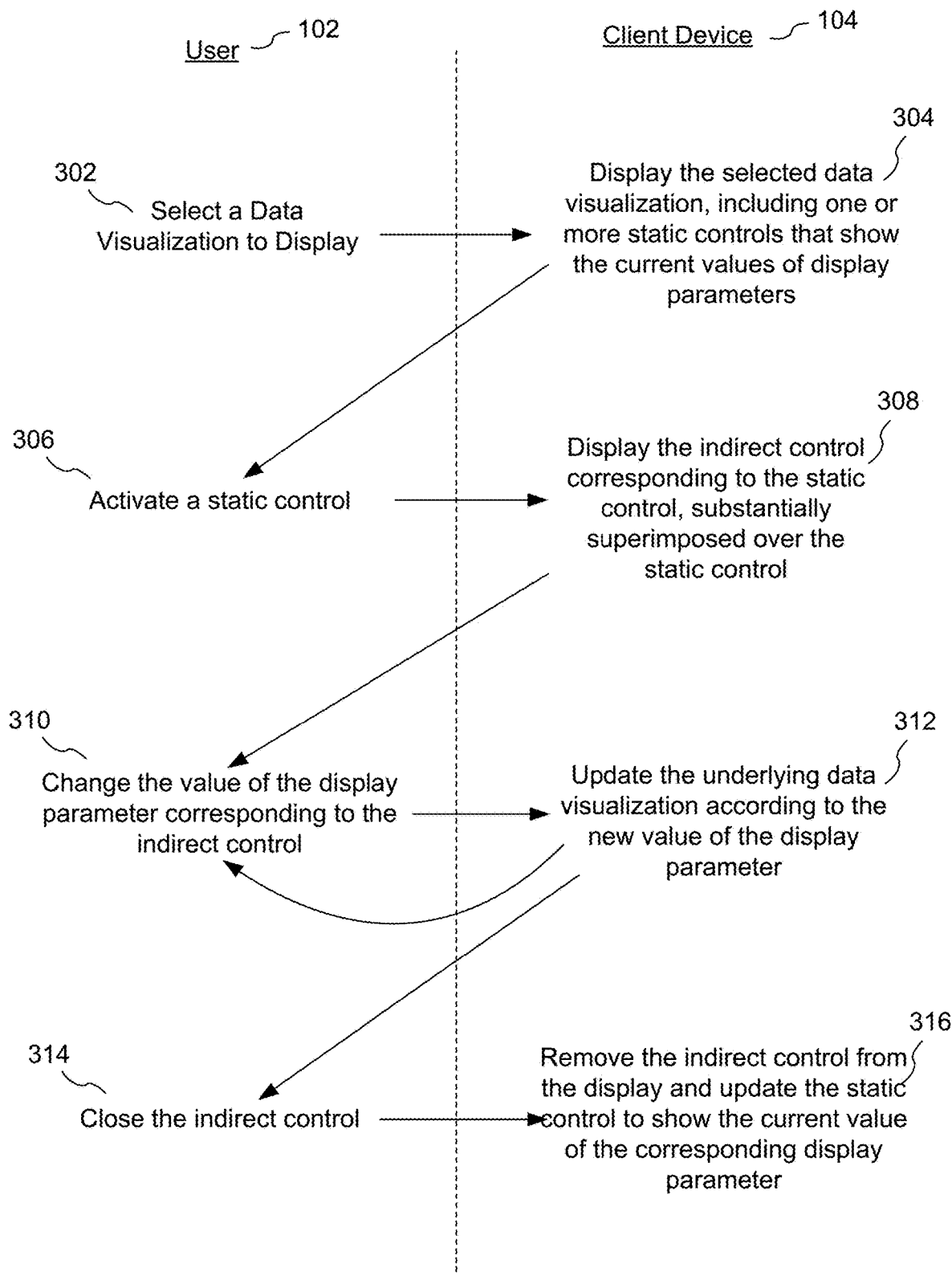
FIG. 3 illustrates how a user interacts with a graphical user interface on a client device according to some embodiments.

FIG. 3 illustrates a typical sequence of operations for utilizing static controls 110 according to some embodiments. In this illustration, a user 102 interacts with a client device 104 in order to view a data visualization 108. Initially, the user 102 selects (302) a data visualization 108 to display. The client device 104 displays (304) the selected data visualization 108. In some instances, the data visualization 108 includes one or more static controls 110, which show the current values 112 (settings) of corresponding display parameters 114. Each of the displayed static controls 110 indicates both the display parameter 114 (e.g., a descriptive name) and the value 112 currently assigned to the display parameter 114. The static controls 110 are not editable.

If a user 102 wishes to change the value 112 associated with a display parameter 114, the user 102 can activate (306) the corresponding static control 110. In some embodiments where the client device 104 has a touch screen display, the user 102 activates (306) a static control 110 by "tapping" on the control 110. Other embodiments use alternative finger gestures to activate (306) a static control 110. In some embodiments, a user 102 activates (306) the static control 110 by double tapping or double clicking on the static control 110, depending on user interface hardware or mechanisms provided by the client device 104.

When the user 102 activates (306) a static control 110, the client device 104 displays (308) the indirect control 116 corresponding to the static control 110. In preferred embodiments, the indirect control 116 is substantially superimposed over the static control 110. The indirect control 116 is larger than the corresponding static control 110. In some embodiments, the linear dimensions of the indirect control 116 are about 2.3 times larger than the linear dimensions of the corresponding static control 110. By making the indirect control 116 larger, the user 102 can more easily adjust the value 112 of the display parameter 114 using a finger (which is not an accurate pointing mechanism for a small screen). Even when using a mouse or other standard pointing device, using the larger popup indirect control 116 is easier for some users 102 who have difficulty with precise motor skills or who have poor eyesight.

Once the indirect control 116 is displayed (308), the user can change (310) the value 112 of the display parameter 114 corresponding to the indirect control 116. In preferred embodiments, the client device 104 immediately updates (312) the data visualization 108 according to the new value 112 of the display parameter 114. For example, a viewer may be looking at sales data for 2011 and 2012. The user 102 would like to see the sales data for 2010 as well. Assuming there is a parameter 114 that identifies the set of years for the sales data, the user 102 can change the value 112 of the parameter 114 from {2011,2012} to {2010, 2011, 2012}. The client device 104 then updates (312) the data visualization 108 so that it includes 2010, 2011, and 2012. In some embodiments, the data visualization 108 is updated immediately; in other embodiments, the data visualization 108 is not updated until the user 102 closes (314) the control.

While an indirect control 116 is active, the user can continue to change (310) the value 112 for the parameter 114, or close (314) the control 116. As noted above, in preferred embodiments, the data visualization 108 is updated (312) each time the user changes (310) the value 112. In other embodiments, the data visualization 108 is updated (312) only after the user 102 closes the control 116. In these embodiments, step 312 executes after step 314. Once the user 102 chooses to close (314) the indirect control 116, the client device 104 removes (316) the indirect control 116 from the display and updates (316) the static control 110 to show the current value 112 of the corresponding display parameter 114.

Figure 4A:
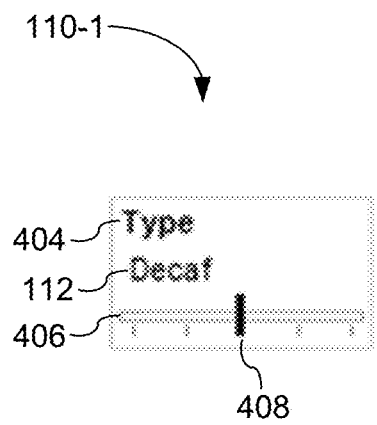
FIGS. 4A and 4B illustrate a corresponding pair of static and indirect controls for a graphical user interface according to some embodiments.
Figure 4B:
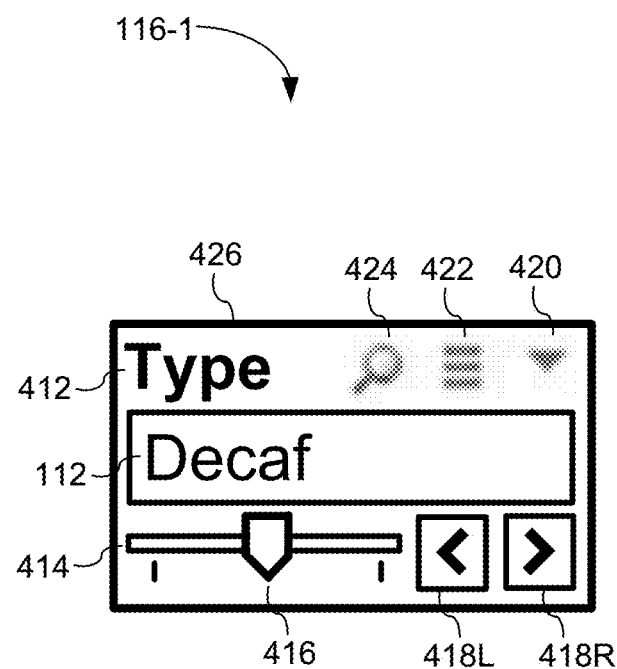

FIGS. 4A and 4B illustrate discrete slider controls 110-1 and 116-1. The slider indicates which of a finite set of options has been selected. In the illustrated examples, the slider is used to select types of coffee (e.g., Regular, Decaf, Espresso, All). In the static discrete slider control 110-1, the slider handle 408 is visible, but cannot be directly moved. In some embodiments, the shape of the slider handle 408 is a moderately thick gray line (e.g., a few pixels), which visually distinguishes it from a moveable slider handle 416 in the corresponding indirect discrete slider control 116-1. The slider bar 406 shows that there are multiple positions where the slider handle 408 could be located. The current value 112 ("Decaf") of the parameter 114 is displayed in the control 110-1, but is not editable. Above the value 112 is the descriptor 404 ("Type"), which identifies the display parameter 114 corresponding to the control 110-1.

When the static control 110-1 is activated, a popup indirect control 116-1 is displayed. The indirect control 116-1 displays a descriptor 412 and the current value 112 of the corresponding display parameter. In some instances the descriptor 412 is the same as the descriptor in the static control 110-1. Because the indirect control 116-1 is larger, some instances will use a longer or more descriptive name 412 for the indirect control 116-1. Some indirect controls 116-1 include buttons, such as buttons 420, 422, and 424 illustrated here in the upper right corner of the indirect control 116-1. For example, the magnifying glass icon 424 will bring up a search dialog box in some embodiments, allowing the user 102 to search for the desired value 112 for the display parameter 114. In some embodiments, there is a more/less button 420, which allows the user 102 to expand or contract the size of the control 116-1. In some embodiments, there is a menu or list icon 422 that will bring up a list of possible values for the display parameter 114. As FIG. 4A shows, there are no buttons analogous to buttons 420, 422, and 424 in the static control 110-1 because the static control 110-1 is not editable. The absence of these buttons also helps clarify visually that the static control 110-1 is not editable.

In some embodiments, indirect control 116-1 includes a border or outline 426, which distinguishes it from the non-editable static control. Like the static control 110-1, the indirect control 116-1 has a slider handle 416, but it is shaped differently to indicate that a user 102 can move the handle 416. The slider handle 416 moves along the slider track 414. In some embodiments, the indirect slider control 116-1 also includes buttons 418L and 418R which can be clicked or tapped to move the slider handle 416 left or right.

Although FIGS. 4A and 4B depict discrete sliders, the same techniques can be applied to continuous sliders, where the possible values are in a continuous range. For example, the range could be all numbers between 0 and 1, or all numbers between 0 and 100. In some instances, the "continuous" range of values is limited to a certain number of decimal places (e.g., two decimals).

Figures 5A, 5B:
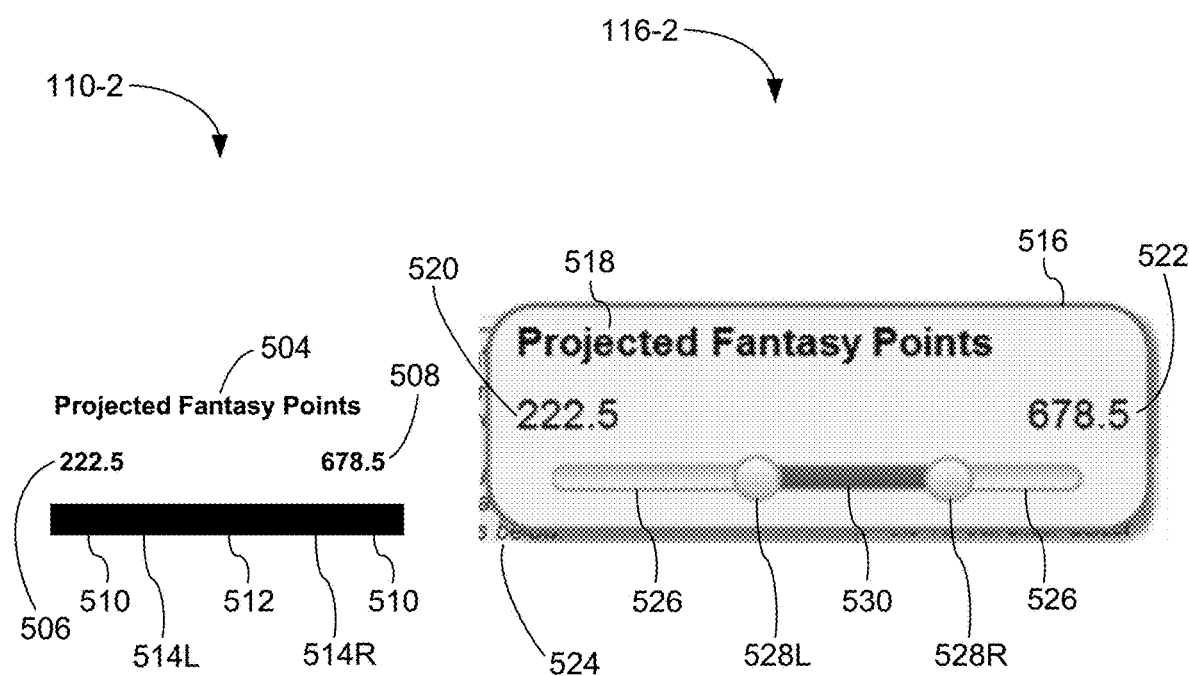
FIGS. 5A and 5B illustrate a corresponding pair of static and indirect controls for a graphical user interface according to some embodiments.

FIGS. 5A and 5B illustrate another pair of static and indirect controls. These controls are used for display parameters 114 whose values 112 are a range (e.g., numeric range or date range). The static slider control 110-2 includes a title or descriptor 504, which identifies the corresponding display parameter 114. The lower limit 506 of the selected range in FIG. 5A is the value 222.5, and the upper limit 508 of the selected range is 678.5. The value 112 of the display parameter 114 is thus the range 222.5-678.5. The lighter gray slider rectangle 510 (which is partially covered by the selected range 512) indicates the absolute lower and upper limits that may be selected. The illustrated selected range 512 is roughly in the middle of possible range. The selected range 510 is bounded by the lower limit 514L and 514R, which are the left and right endpoints of the selected range 512.

The corresponding indirect slider control 116-2 similarly displays a title or descriptor 518, which may be the same as the title/descriptor 504 of the corresponding static control 110-2. The lower limit 520 of the selected range is currently the value 222.5 and the upper limit 522 of the selected range is currently the value 678.5. These limits specify the selected range, and the selected range is also depicted by the slider bar 526 and slider handles 528L and 528R. The slider handles 528L and 528R can be moved independently by the user 102, and the locations of these slider handles determines the selected range 530. One of ordinary skill in the art would recognize that many alternative shapes/designs may be used for the slider handles 528L and 528R, including ones that look like the slider handle 416 in FIG. 4B.

In this embodiment, the indirect control 116-2 has a border or outline 516, which helps to distinguish it visually from the corresponding static control 110-2. Because the indirect control 116-2 is a popup, it covers a portion of the display, which is illustrated by region 524, which shows a portion of the display hidden by the indirect control popup 116-2.

In some embodiments, the lower limit 520 and upper limit 522 may be edited. For example, in some embodiments, tapping on the lower limit 520 brings up another popup and a soft keyboard, allowing the user 102 to type in a value 112 for the lower limit 520 (the same would apply for the upper limit 522). In some embodiments, the absolute lower and upper limits (not shown in FIG. 5B) are displayed near the left and right endpoints of the slider track 526. In some embodiments, the lower and upper limits 520 and 522 do not have a fixed location in the indirect control 116-2, but move so that they appear adjacent to the slider handles 528L and 528R.

FIGS. 6A-6D illustrate a static control 110-3, and how it is activated to view indirect control 116-3 (or alternatively 116-3A). FIG. 6A illustrates a data visualization 108, which is a graph of monthly profit. As seen in the upper right, there are two display parameters, which are graphically displayed in static controls 110-3 and 610. The static control 610 corresponds to a display parameter that specifies the years that appear in the data visualization. The control 610 indicates that the data visualization includes 2009 and 2010. Static control 110-3 corresponds to a display parameter 114 that specifies what portion of the market is selected for the data appearing in the data visualization 108. The title or descriptor 606 indicates to the user 102 that the static control 110-3 specifies the market. In this example, the selected market segments 608 are "East," "South," and "Central." In some embodiments, if all of the market segments were selected, the identifier "(All)" or "All" would appear below the title/descriptor 606. In some embodiments, both selected and unselected segments appear in the control 110-3, and the selected segments are marked in some manner, such as using a checkmark.

Figure 6B:

FIG. 6B illustrates that a user 102 can activate the static control 110-3. In the illustrated example, the user activates the static control 110-3 by tapping (614) on the control 110-3. Although not illustrated, the user could have activated the Year static control 610 by tapping on that control.

Figure 6C:
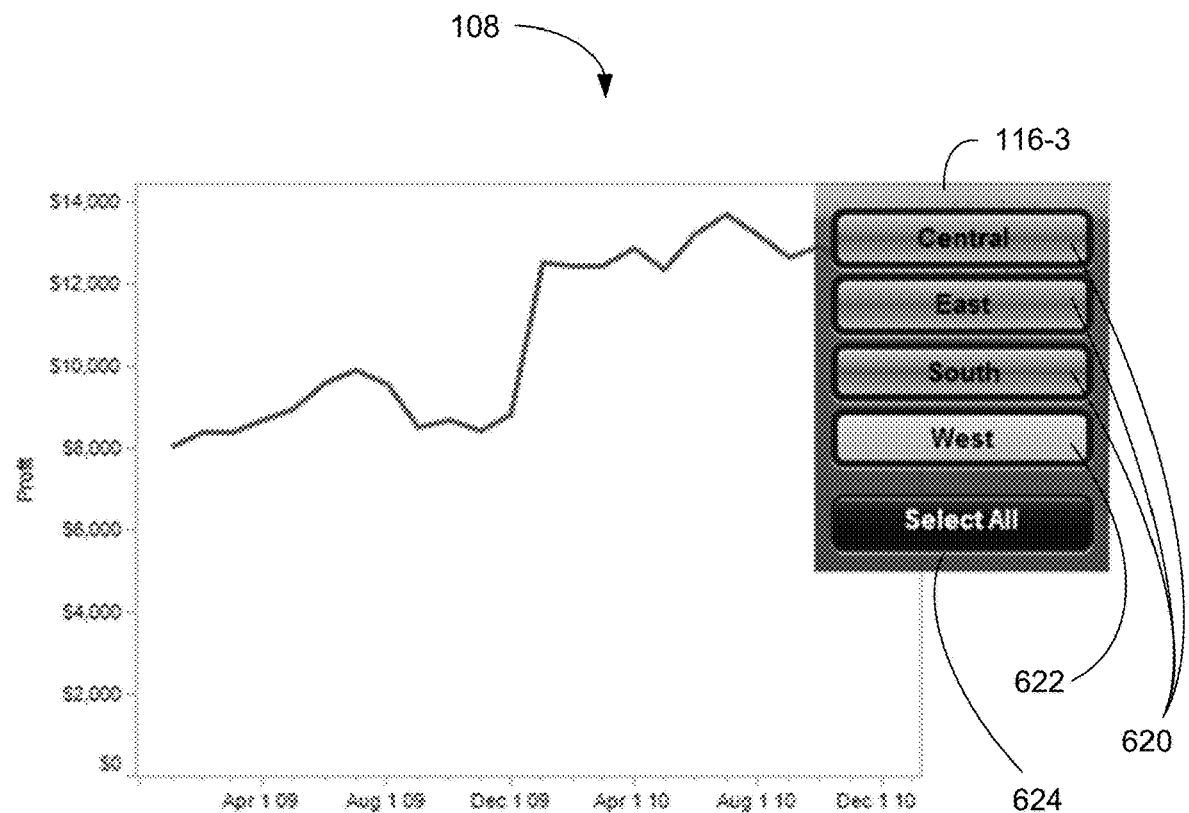

FIG. 6C illustrates a popup indirect control 116-3 corresponding to the static control 110-3. In this embodiment, the indirect control 116-3 includes a button 620 for each of the market segments that is already selected, as well as a button 622 for the one segment ("West") that is not currently selected. The appearance of the buttons 620 and 622 indicate which ones are currently selected. In some embodiments, there is also a button 624 to select all of the segments. In some of these embodiments, the label on the button 624 switches to "Unselect All" immediately after a user 102 chooses to "Select All." Some embodiments also include an "Invert Selection" button (not illustrated) that allows a user 102 to invert the items that are selected (i.e., the selected items become unselected and vice versa). In some embodiments, where there are too many options to display in the control, there is a vertical scroll bar to scroll through the options that appear in the display. On touch-sensitive displays, some embodiments scroll through the options using finger gestures.

As FIG. 6C illustrates, the indirect control popup 116-3 covers a portion of the data visualization 108, whereas the corresponding static control 110-3 does not. Although not illustrated in the embodiment of FIG. 6C, the static control 116-3 may include a border/outline (similar to the border 426 in control 116-1 and border 516 in control 116-2). Some embodiments also include a title/descriptor, similar to the title/descriptor 412 in control 116-1 and title/descriptor 518 in control 116-2.

Figure 6D:
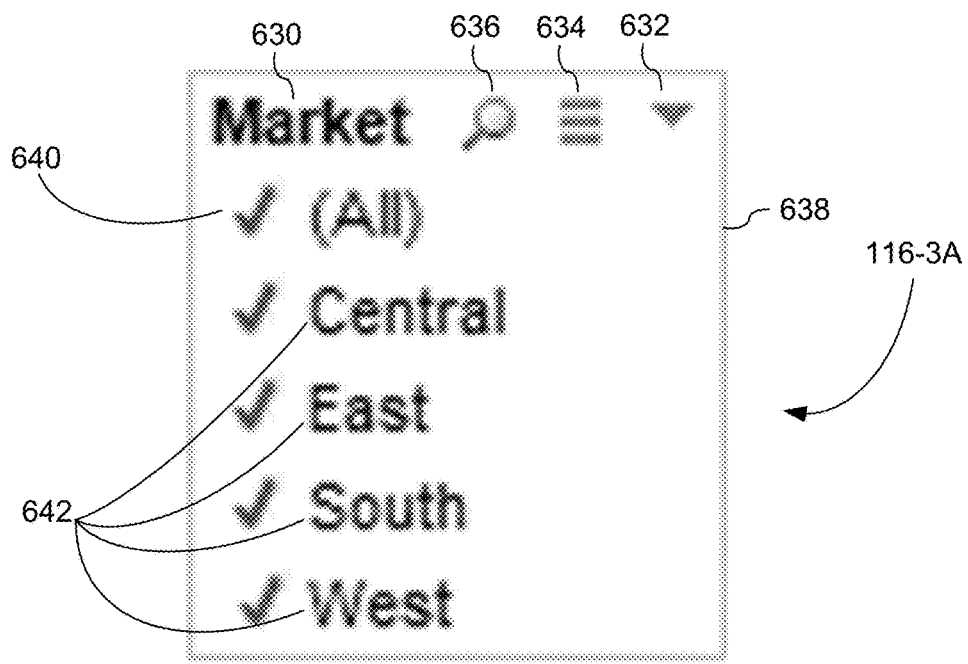

FIG. 6D illustrates an alternative indirect control popup 116-3A that corresponds to static control 110-3. In this embodiment, the control 116-3A includes a title or descriptor 630, which in some instances is longer or more descriptive than the corresponding title/descriptor 606 in the corresponding static control. Some embodiments also include one or more buttons 632, 634, and 636. These buttons behave in the same way as buttons 420, 422, and 424, which were described above with respect to FIG. 4B.

In some embodiments, indirect control 116-3A includes an outline or border 638, which distinguishes it from the static control 110-3. In some embodiments, the option to select all of the options appears at the top of the list, and may appear in parentheses and/or in a different color or font to indicate that it behaves differently from the ordinary elements 642. In some embodiments, individual elements 642 are selected (or unselected) by tapping or clicking. Other embodiments use alternative selection methods, such as double clicking or double tapping. In this embodiment, a checkmark 640 appears next to an element that has been selected. In some embodiments, the color of an element reflects whether the element has been selected (e.g., blue for selected elements, black for unselected elements).

Figures 7A, 7B:
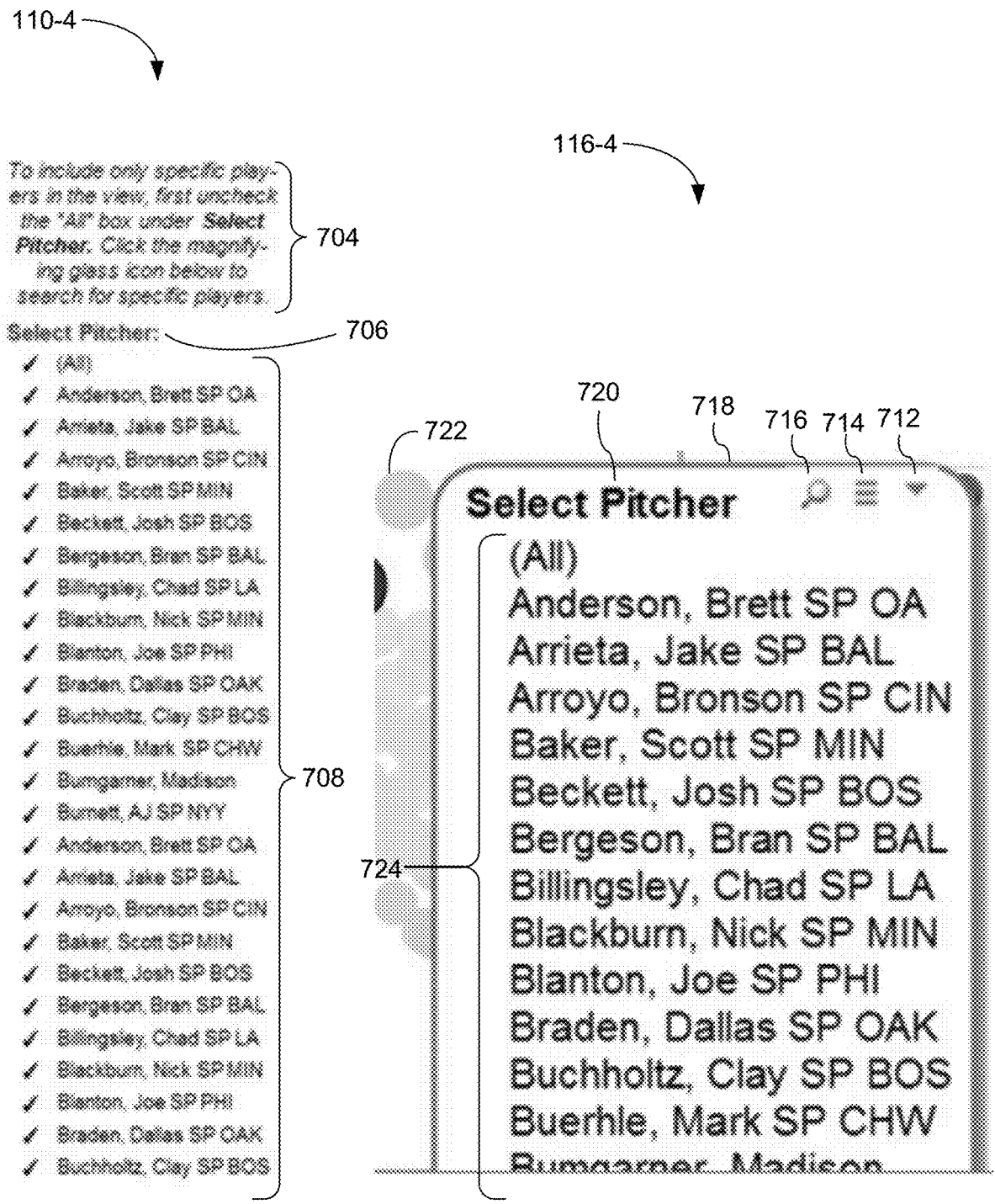
FIGS. 7A and 7B illustrate a corresponding pair of static and indirect controls for displaying large lists according to some embodiments.

FIGS. 7A and 7B illustrate static and indirect controls 110-4 and 116-4 that display selection lists, similar to controls 110-3 and 116-3. In these examples, however, there are too many list elements to display on the screen at one time. The static control 110-4 includes an optional header 704 that explains to a user how to select specific elements (in this case, baseball pitchers). This static control 110-4 also illustrates that the title/descriptor 706 can be written as a verb phrase rather than a noun (i.e., "Select Pitcher" rather than "Pitchers"). In this embodiment, the selected pitchers 708 are listed with checkmarks next to the names. Because "(All)" has been selected, all of the individual pitchers are included. In some embodiments, only the selected pitchers appear in the list 708 for the static control 110-4. For example, if only three pitchers were selected, only those three pitchers would appear in the list 708. In other embodiments, all of the pitchers are listed in the static control 110-4, but only the selected pitchers have checkmarks next to their names.

When the user 102 activates the static control 110-4 (e.g., by tapping on the control), an indirect control 116-4 appears substantially superimposed over the static control 110-4. As illustrated above in FIGS. 4B and 6D, indirect control 116-4 may include a search button 716 (e.g., using a magnifying glass icon), which brings up a search dialog box when selected. A search button 716 may be particularly useful for large lists, such as a list of baseball pitchers. The indirect control 116-4 may also include a more/less button 712 or a menu/list button 714. One of ordinary skill in the art would recognize that an indirect control 116-4 may provide additional buttons that facilitate user selection of list items.

In some embodiments, an indirect control 116-4 includes a border or outline 718 to designate the control as a popup that can be edited. The indirect control 116-4 includes a title or descriptor 720 to identify the corresponding display parameter 114. As noted previously, the title/descriptor 720 on the indirect control 116-4 need not be identical to the title/descriptor 706 on the corresponding static control 110-4. Here, the descriptor 706 for the static control 110-4 includes a colon ":" that is not present in the descriptor 720 for the indirect control 116-4.

A portion 722 of the data visualization 108 is depicted in FIG. 7B, illustrating that the indirect control popup 116-4 covers some of the data visualization 108 when it is displayed. In some embodiments, select list elements (e.g., pitchers) are displayed with a different color or different font, or are shown with a checkmark or other symbol to identify them as selected. In some embodiments, selected elements are designated in two or more ways (e.g., using color and checkmarks). In the example illustrated in FIG. 7B, no visible elements are currently selected from the list 724. Because the displayed portion of the list 724 is not all of the pitchers, some undisplayed pitchers could be selected.

For a long list 724 in an indirect control 116, various scrolling techniques may be used. In some embodiments, the list of elements is scrolled using a finger motion on a touch-sensitive screen. In other embodiments, a scroll bar (not shown) is used. One of skill in the art would recognize that any techniques used for graphical user interface controls may be applied to the direct popup controls 116 disclosed herein.

Figure 8A:
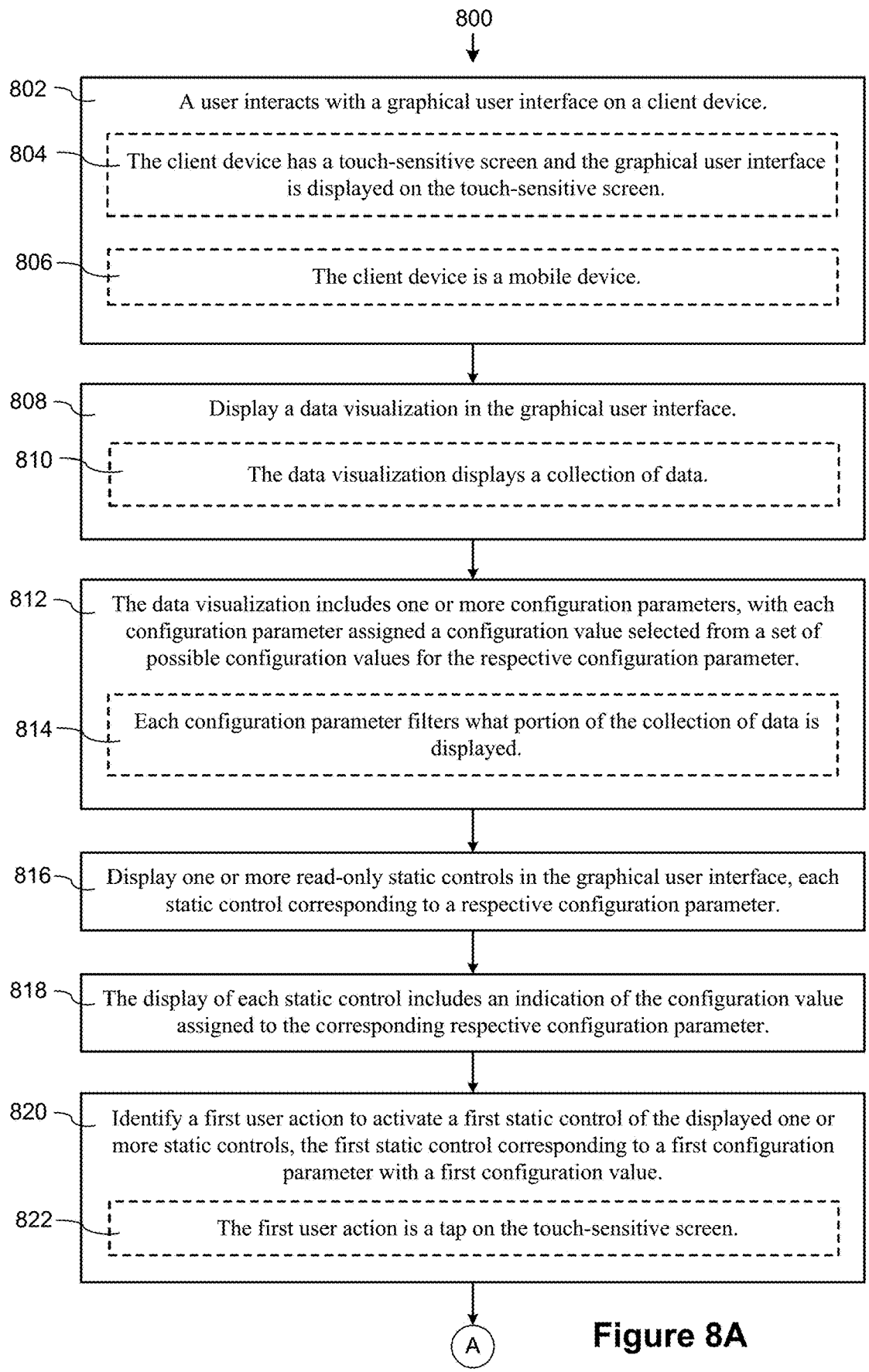
FIGS. 8A and 8B provide a flowchart of a process, performed at a client device, for utilizing a static control corresponding to a data visualization according to some embodiments.
Figure 8B:
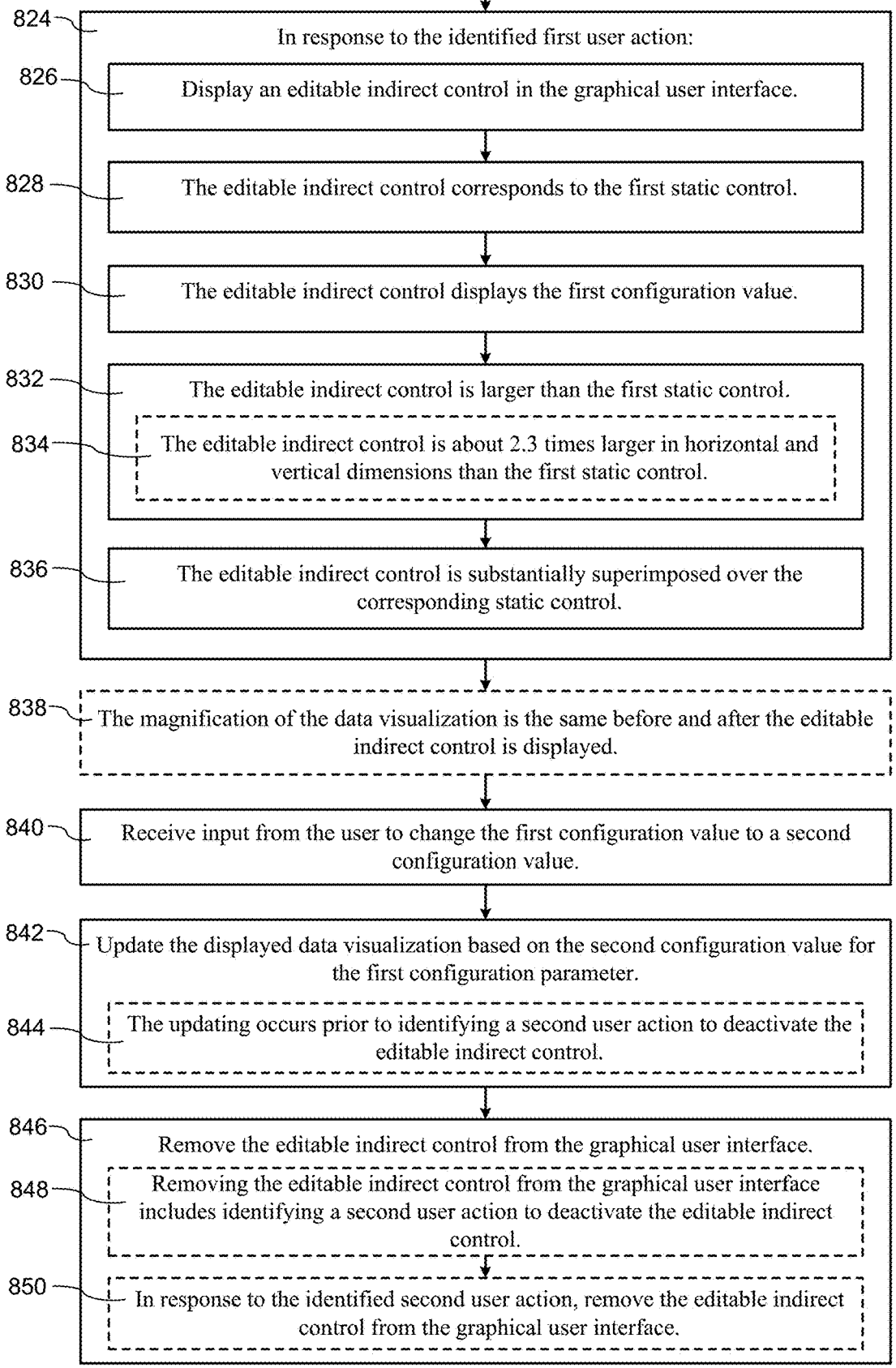

FIG. 8 is a flowchart of an exemplary process for interacting with a graphical user interface on a client device with a small screen. The user 102 interacts (802) with a graphical user interface on a client device 104. In some embodiments, the client device 104 has (804) a touch-sensitive screen and the graphical user interface is displayed (804) on the touch-sensitive screen. In some embodiments, the client device is (806) a mobile device, such as a smart phone or tablet computer.

The client device 104 displays (808) a data visualization 108 in the graphical user interface. In some embodiments, the data visualization 108 displays (810) a collection of data. The data visualization 108 includes (812) one or more configuration parameters 114. Each configuration parameter 114 is assigned (812) a configuration value 112 selected from a set of possible configuration values. As illustrated above, a configuration value 112 can be a single value, a set of values, or a range of values. Further, the values can be numeric, character strings, Boolean (true/false), date values, etc. A set of possible values can be a finite list, a continuous range, a discrete range, etc. One of ordinary skill in the art would recognize that there are many ways to specify a set of possible configuration values 112 for a configuration parameter 114. In some embodiments, each configuration parameter 114 filters (814) the portion of the collection of data that is displayed.

The client device 104 displays (816) one or more read-only static controls 110 in the graphical user interface. Each of the static controls 110 corresponds (816) to a respective configuration parameter 114. The display of each static control 110 includes (818) an indication of the configuration value 112 assigned to the corresponding configuration parameter 114. This was illustrated above in FIGS. 4A, 5A, 6A, and 7A, where static controls 110-1, 110-2, 110-3, and 110-4 display the configuration values 112 of the associated configuration parameters 114.

The client device 104 identifies (820) a first user action to activate a first static control 110. The first static control 110 is (820) one of the static controls 110 displayed in the data visualization 108, and corresponds (820) to a first configuration 114 parameter with a first configuration value. In some embodiments, the first user action is a tap on the touch-sensitive screen.

In response (824) to the identified first user action, the client device displays (826) an editable indirect control 116 in the graphical user interface. The editable indirect control 116 corresponds (828) to the first static control, and the editable indirect control 116 displays (830) the first configuration value. The editable indirect control 116 is (832) larger than the first static control. In some embodiments, the indirect control 116 is (834) about 2.3 times larger in horizontal and vertical dimensions than the first static control 110. The indirect control 116 is (836) substantially superimposed over the corresponding indirect control. In some embodiments, the magnification of the data visualization 108 is (838) the same before and after the editable indirect control 116 is displayed. That is, only the control changes, not the data visualization. (Historically, a user 102 of a device 104 with a small screen would have to magnify the entire display in order to manipulate one control, then shrink the screen back to the appropriate size.)

The client device 104 receives (840) input from the user to change the first configuration value to a second configuration value. As illustrated above in FIGS. 4B, 5B, 6C, 6D, and 7B, the specific methodology for changing the value depends on the indirect control 116. The client device 104 updates (842) the displayed data visualization 108 based on the second configuration value for the first configuration parameter 114. For example, in FIG. 6D, the user 102 has chosen to add the Western region to the profit data displayed in the data visualization 108 (the Western region was not part of the original market selection as shown in FIG. 6A). In some embodiments, updating the data visualization occurs (844) prior to identifying a second user action to deactivate the editable indirect control. In these embodiments, the data visualization 108 is updated immediately, while the indirect control 116 is still displayed. In these embodiments, the user 102 can make several changes (e.g., "what if" selections), and see how the selections affect the data visualization 108 each time a selection is made.

At some point, the client device 104 removes (846) the editable indirect control 116 from the graphical user interface. In some embodiments, removing the editable indirect control 116 from the graphical user interface includes (848) identifying a second user action to deactivate the editable indirect control 116. In some embodiments, the second user action is a tap on the screen outside of the indirect control 116. In some embodiments, the indirect control 116 includes a button or region (not shown in FIG. 4B, 5B, 6C, 6D, or 7B) that closes the indirect control 116 when pressed or clicked.

In response to the identified second user action, the client device 104 removes (850) the editable indirect control 116 from the graphical user interface.

In some alternative embodiments, the client device 116 removes the editable indirect control 116 from the graphical user interface without specific action by the user 102. For example, the client device may remove the editable indirect control 116 from the display after a certain amount of inactivity (e.g., 30 seconds, 2 minutes, etc.). In some embodiments, the user 102 can take the second user action to remove the indirect control 116 from the display, but the indirect control 116 will also be removed automatically under other circumstances (such as a predefined period of inactivity).

FIG. 9 illustrates some types of data visualizations. The overall data visualization includes a composite of three data visualizations 902, 904, and 906. Although the full composite data visualization would be too large for some small display screens 208 on client devices 104, each of the individual data visualizations 902, 904, and 906 would be appropriate for a small screen 208. (The full data visualization in FIG. 9 was designed for a full-size computer monitor.) FIG. 9 is intended to illustrate the variety of data visualizations 108.

The foregoing description, for purpose of explanation, has been described with reference to specific embodiments. However, the illustrative discussions above are not intended to be exhaustive or to limit the invention to the precise forms disclosed. For example, the usage of static controls 116 is not limited to data visualizations. Static controls 116 may be applied effectively for other displays that use controls for data entry, including both web applications, and applications that run on the client device without a web browser 220. Furthermore, static controls may be utilized even with larger display devices, enabling a person 102 with sight impairment or limited motor skills to more effectively interact with a software application 106. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of interacting with a graphical user interface on a client device, comprising:

displaying a data visualization of a user-selected data set according to one or more data-selection parameters, wherein each data-selection parameter is assigned a respective parameter value that filters the data set to a user-specified range included in the data visualization, and the data visualization is displayed in the graphical user interface;

displaying one or more graphical elements in the graphical user interface, each graphical element corresponding to a respective data-selection parameter, wherein each graphical element displays an indication of the respective parameter value assigned to the corresponding respective data-selection parameter, and wherein no respective graphical element is directly editable by user inputs directed to the respective graphical element;

receiving a first user input directed to a first graphical element of the displayed one or more graphical elements, the first graphical element displaying a first data-selection parameter with a first parameter value;

in response to the first user input:

displaying, in the graphical user interface, a control popup with interactive control elements, wherein:
the control popup displays the first data-selection parameter corresponding to the first graphical element and the first parameter value; and
the first parameter value is directly editable by one or more user inputs directed to the interactive control elements of the control popup;
receiving a second user input directed to one or more of the interactive control elements of the control popup to change the first parameter value of the first data-selection parameter to a second parameter value; and
updating the displayed data visualization according to an updated range corresponding to the second parameter value of the first data-selection parameter.

2. The method of claim 1, wherein the displayed data visualization is updated according to the updated range corresponding to the second parameter value while receiving the second user input.

3. The method of claim 1, including updating the first graphical element to display the second parameter value of the first data-selection parameter.

4. The method of claim 1, including, after receiving the second user input directed to the one or more of the interactive control elements of the control popup, removing the control popup from the graphical user interface.

5. The method of claim 4, wherein the control popup is removed from the graphical user interface in accordance with a determination that a period of time that has elapsed since receiving a prior user input exceeds a predefined period of inactivity.

6. The method of claim 4, including, after receiving the second user input directed to the one or more of the interactive control elements of the control popup, receiving a third user input to deactivate the control popup, wherein the control popup is removed from the graphical user interface in response to the third user input.

7. The method of claim 6, wherein updating the displayed data visualization according to the updated range corresponding to the second parameter value of the first data-selection parameter occurs prior to receiving the third user input.

8. The method of claim 1, wherein the control popup is substantially superimposed over the corresponding first graphical element.

9. The method of claim 1, wherein the control popup is larger than the first graphical element.

10. The method of claim 9, wherein the control popup is about 2.3 times larger in horizontal and vertical dimensions than the first graphical element.

11. The method of claim 1, wherein the client device has a touch-sensitive screen, the graphical user interface is displayed on the touch-sensitive screen, and the first user input is a tap on the touch-sensitive screen.

12. The method of claim 1, wherein a size of the data visualization is the same before and after the control popup is displayed.

13. The method of claim 1, wherein the client device is a mobile device.

14. A client device, comprising:
one or more processors;
memory; and
one or more programs stored in the memory for execution by the one or more processors, the one or more programs comprising instructions for:
displaying a data visualization of a user-selected data set according to one or more data-selection parameters, wherein each data-selection parameter is assigned a respective parameter value that filters the data set to a user-specified range included in the data visualization, and the data visualization is displayed in the graphical user interface;
displaying one or more graphical elements in the graphical user interface, each graphical element corresponding to a respective data-selection parameter, wherein each graphical element displays an indication of the respective parameter value assigned to the corresponding respective data-selection parameter, and wherein no respective graphical element is directly editable by user inputs directed to the respective graphical element;
receiving a first user input directed to a first graphical element of the displayed one or more graphical elements, the first graphical element displaying a first data-selection parameter with a first parameter value;
in response to the first user input:
displaying, in the graphical user interface, a control popup with interactive control elements, wherein:
the control popup displays the first data-selection parameter corresponding to the first graphical element and the first parameter value; and
the first parameter value is directly editable by one or more user inputs directed to the interactive control elements of the control popup;
receiving a second user input directed to one or more of the interactive control elements of the control popup to change the first parameter value of the first data-selection parameter to a second parameter value; and
after receiving the second user input directed to the one or more of the interactive control elements of the control popup, updating the displayed data visualization according to an updated range corresponding to the second parameter value of the first data-selection parameter.

15. The client device of claim 14, wherein the control popup is larger than the first graphical element.

16. The client device of claim 14, wherein a size of the data visualization is the same before and after the control popup is displayed.

17. The client device of claim 14, wherein the client device is a mobile device.

18. A non-transitory computer readable storage medium storing one or more programs configured for execution by a client device having one or more processors and memory storing one or more programs for execution by the one or more processors, the one or more programs comprising instructions for:
displaying a data visualization of a user-selected data set according to one or more data-selection parameters, wherein each data-selection parameter is assigned a respective parameter value that filters the data set to a user-specified range included in the data visualization, and the data visualization is displayed in the graphical user interface;
displaying one or more graphical elements in the graphical user interface, each graphical element corresponding to a respective data-selection parameter, wherein each graphical element displays an indication of the respective parameter value assigned to the corresponding respective data-selection parameter, and wherein no respective graphical element is directly editable by user inputs directed to the respective graphical element;

receiving a first user input directed to a first graphical element of the displayed one or more graphical elements, the first graphical element displaying a first data-selection parameter with a first parameter value;

in response to the first user input:
displaying, in the graphical user interface, a control popup with interactive control elements, wherein:
the control popup displays the first data-selection parameter corresponding to the first graphical element and the first parameter value; and
the first parameter value is directly editable by one or more user inputs directed to the interactive control elements of the control popup;

receiving a second user input directed to one or more of the interactive control elements of the control popup to change the first parameter value of the first data-selection parameter to a second parameter value; and after receiving the second user input directed to the one or more of the interactive control elements of the control popup, updating the displayed data visualization according to an updated range corresponding to the second parameter value of the first data-selection parameter.

19. The non-transitory computer readable storage medium of claim 18, wherein the control popup is larger than the first graphical element.

20. The non-transitory computer readable storage medium of claim 18, wherein a size of the data visualization is the same before and after the control popup is displayed.

* * * * *